(12) United States Patent
Jané López et al.

(10) Patent No.: US 12,376,596 B2
(45) Date of Patent: Aug. 5, 2025

(54) CUTTING DEVICE FOR SPLITTING AN ANIMAL CARCASS IN HALF AND ROBOT INCORPORATING SUCH CUTTING DEVICE

(71) Applicant: FRONTMATEC-AIRA, SOCIEDAD LIMITADA SOCIEDAD UNIPERSONAL, Cardona (ES)

(72) Inventors: Francisco Javier Jané López, Cardona (ES); Jordi Cañellas Garrigasait, Cardona (ES)

(73) Assignee: FRONTMATEC-AIRA, SOCIEDAD LIMITADA SOCIEDAD UNIPERSONAL, Cardona (ES)

( * ) Notice: Subject to any disclaimer, the term of this patent is extended or adjusted under 35 U.S.C. 154(b) by 0 days.

(21) Appl. No.: 18/554,356

(22) PCT Filed: Apr. 1, 2022

(86) PCT No.: PCT/ES2022/070198
§ 371 (c)(1),
(2) Date: Oct. 6, 2023

(87) PCT Pub. No.: WO2022/214720
PCT Pub. Date: Oct. 13, 2022

(65) Prior Publication Data
US 2024/0188575 A1  Jun. 13, 2024

(30) Foreign Application Priority Data

Apr. 9, 2021 (ES) .................................. 202130314

(51) Int. Cl.
A22C 17/00 (2006.01)
A22C 17/02 (2006.01)
B25J 11/00 (2006.01)

(52) U.S. Cl.
CPC .......... *A22C 17/0006* (2013.01); *A22C 17/02* (2013.01); *B25J 11/0045* (2013.01)

(58) Field of Classification Search
CPC ............ A22C 21/0046; A22C 21/0053; A22C 17/0006; A22C 17/02
(Continued)

(56) References Cited

U.S. PATENT DOCUMENTS 4,507,822 A * 4/1985 Herubel ................. A22B 5/202
452/160
5,655,960 A * 8/1997 Van Horeebeck ..... A22B 5/202
452/160
(Continued)

FOREIGN PATENT DOCUMENTS

CN  103444832  12/2013
EP  1125501  8/2001
(Continued)

*Primary Examiner* — Richard T Price, Jr.
(74) *Attorney, Agent, or Firm* — ICE MILLER LLP; Safet Metjahic

(57) ABSTRACT

The present invention relates, according to a first aspect, to a tool for cutting in half a carcass of a slaughtered animal, preferably of a bovine animal, in a fully automated manner. The cutting tool of the present invention incorporates in the cutting tool itself two different guiding mechanisms: an inner follower mechanism of the carcass capable of following the inner side of the carcass during the cutting process, and an outer follower mechanism of the carcass capable of following the outer side of the carcass during the cutting process, which substantially improve the accuracy of the cutting process and eliminate any type of manual action when cutting or guiding the part.

It also relates, according to a second aspect, to a robot comprising said cutting tool.

15 Claims, 7 Drawing Sheets

(58) Field of Classification Search
USPC ......................................................... 452/153
See application file for complete search history.

(56) References Cited

U.S. PATENT DOCUMENTS 6,607,431 B2    8/2003  Torrelli
10,028,514 B2 *  7/2018  Driscoll ................. A22B 5/208

FOREIGN PATENT DOCUMENTS

| | | |
|---|---|---|
| EP | 1125501 A2 | 8/2001 |
| EP | 1125501 A3 | 10/2001 |
| EP | 2462810 | 6/2012 |
| EP | 3677120 | 7/2020 |
| EP | 3677120 A1 | 7/2020 |
| ES | 2293805 A1 | 3/2008 |
| WO | 1998/008088 | 2/1998 |

* cited by examiner

CUTTING DEVICE FOR SPLITTING AN ANIMAL CARCASS IN HALF AND ROBOT INCORPORATING SUCH CUTTING DEVICE

CROSS-REFERENCE TO RELATED PATENT APPLICATIONS

This is a United States National Phase Application under 35 U.S.C. § 371 of International Patent Application No. PCT/ES2022/070198, filed Apr. 1, 2022, and claims priority to Spanish Patent Application No. P202130314, filed Apr. 9, 2021, which is incorporated by reference herein in its entirety. The International Application was published on Oct. 13, 2022, as International Publication No. WO 2022/214720 A1.

OBJECT OF THE INVENTION

The present invention relates to the technical field of slaughtering equipment, and in particular to a fully automated tool for cutting in half the carcass of a slaughtered animal, preferably of a bovine animal such as a cow; wherein the cutting tool is configured to be mounted on a robot.

The present invention also relates to a robot comprising such a cutting tool.

BACKGROUND OF THE INVENTION

The term "bovine carcass" refers to the anatomical structure remaining after a live bovine animal has been slaughtered under standard slaughterhouse procedures, flayed (removing entire skin), eviscerated and its head detached.

The classes of bovine carcasses that can be identified post-mortem are essentially: steers, male calves, yearlings, young bulls, calves, heifers, cows and bulls.

When processing a bovine carcass or of another type of animal of similar body structure, it is usually divided longitudinally along the entire length of the spine (i.e. along the symmetrical plane) into two halves, known in the jargon as right half-carcass and left half-carcass, to facilitate the subsequent processing of each of these two halves.

Depending on the size and configuration of each type of animal slaughtered, the use of a cutting machine in two different halves is required, which is adapted to each type and size of piece.

In large, highly automated animal-processing factories, bovine carcasses hang from a conveyor line hanging from the two legs and cutting into two halves of the cow carcass is carried out from top to bottom.

The technology available today for cutting the carcass of a cow generally involves semi-automatic processing, and the employment of labor remains large and the degree of automation low.

Some devices for cutting a bovine carcass into two halves are known in the state of the art. These cutting devices generally comprise a saw/blade disc or saws for the symmetrical division of the piece.

However, these types of devices for cutting a bovine carcass into two halves known to date have the drawback of lacking guidance means on the dorsal and ventral side of the piece that are correctly adapted to the geometry of the carcass, so that the guidance of the piece is not efficient and the piece can move and be deflected, resulting in an imperfect cut. This guidance on both sides (dorsal and ventral) of the animal's carcass is essential in the cutting process, since there is a remarkable variability in the morphology and size of each carcass, and in addition the carcasses are hung and suspended only by their legs. The guidance thus provides the stability and precision necessary for the longitudinal cutting of the carcass to be optimal.

It is therefore clear that there is a need for a tool for cutting in half a carcass of a slaughtered bovine animal, where the cutting tool is configured to be mounted on a robot, and also to have a robot comprising said cutting tool, which allow longitudinal cutting along the entire spine of the carcass with much more precision and which at the same time allows the piece of the animal to be correctly guided and supported during the cutting process from top to bottom, taking into account that there is great variability in the morphology and size of each carcass.

DESCRIPTION OF THE INVENTION

The first aim of the present invention is to solve the aforementioned drawbacks by developing a tool for cutting a meat carcass into two halves, preferably of a slaughtered bovine or other type of animal of similar body structure.

According to this first object, the present invention relates to a tool for cutting a meat carcass piece into two halves, wherein the carcasses are suspended hanging from their legs, wherein the cutting tool is adapted to be coupled to a robot, and wherein the cutting tool comprises:
 a frame, configured to be connected to a robot arm,
 means for cutting the carcass in two halves by means of a longitudinal cut,
 a means of actuating the cutting means of the carcass,
 means for guiding the carcass during the cutting process, comprising:
  a follower mechanism of the inner side of the carcass, configured to follow the inner side of the carcass during the cutting process, and
  a follower mechanism of the outer side of the carcass, configured to follow the outer side of the carcass during the cutting process.

The great advantage that the cutting tool of the present invention achieves over the known ones is that it integrates two different guiding mechanisms in the cutting tool itself: an inner follower mechanism of the carcass capable of following the inner side of the carcass during the cutting process, and an outer follower mechanism of the carcass capable of following the outer side of the carcass during the cutting process. These followers on either side of the carcass optimize the accuracy of the cutting process and also eliminate any type of manual action when cutting or guiding the carcass, that is, they make the cutting process completely automatic.

In this patent specification, the term "meat piece" is understood to mean a piece of a slaughtered animal, preferably of a bovine animal. The term "bovine" refers to the animals included in this subfamily of mammals, such as: steers, male calves, yearlings, young bulls, calves, heifers, cows and bulls, without this list being limiting.

The term used in this patent to refer to the animal body is "carcass". The term "carcass" means the anatomical structure that remains after a live animal has been slaughtered under standard slaughterhouse procedures, flayed (entire skin), eviscerated and its head detached (in the occiputatloid joint).

The terms "half carcass" or "half" refer to each of the two parts resulting from dividing the carcass by a longitudinal cut passing through the midline of the spine.

The terms "outer side" or "dorsal side" refer to the part corresponding to the back of the animal carcass; and the terms "inner side" or "ventral side" to refer to the part corresponding to the belly of the animal carcass.

Possible embodiments of the device according to the dependent claims are described below.

According to a preferred embodiment of the invention, the inner follower mechanism of the carcass is configured with at least the following elements:
- an arm articulated by its upper end to a point on the frame,
- a first actuating means for actuating the articulated arm,
- an inner side support, which is articulately fastened at the lower end of the articulated arm,
- a second actuating means for rotation of the inner side support,
- one or more inner side rollers connected to the inner side support, wherein the one or more inner side rollers are configured to guide the ventral part of the carcass.

According to a preferred embodiment of the invention, the outer follower mechanism of the carcass is configured with at least the following elements:
- an upper tilting arm for supporting one or more upper outer side rollers, wherein the upper tilting arm tilts with respect to a common pivot axis disposed at a point of the frame,
- one or more upper outer side rollers for upper guidance of the dorsal part of the carcass, wherein one or more upper outer side rollers is(are) disposed at the free end of the upper tilting arm,
- a third actuation means for rotation of the upper tilting arm,
- a lower tilting arm for supporting one or more lower outer side rollers, wherein the lower tilting arm tilts with respect to the same pivot axis of the frame,
- one or more lower outer side rollers for lower guidance of the dorsal part of the carcass, wherein one or more lower outer side rollers is(are) disposed at the free end of the lower tilting arm,
- a fourth actuation means for the rotation of the lower tilting arm.

In this patent specification, the term "roller" is understood as a rotating wheel. The roller can be an essentially cylindrical wheel or have a certain taper that decreases towards the inside.

The remarkable advantages achieved by this preferred embodiment of the invention are the following:
- the integration into the cutting tool of upper and lower outer side rollers for the lower guidance by two different points of the dorsal part of the carcass, where the upper and lower rollers move independently of each other, allows the forces of both the upper and lower rollers to be adjusted independently, which makes the guidance by the dorsal part of the carcass during the cutting process fully automatic and better adapted to the morphology of the carcass; and
- the integration in the cutting tool of one or more inner side rollers with their respective degrees of freedom thanks to the existence of an articulated arm and an inner side articulated support makes it possible for the guiding on the ventral part of the carcass during the cutting process to be fully automatic and better adapted to the morphology of the carcass.

The aforementioned two different technical effects contribute to the higher cutting accuracy of the carcass compared to other conventional cutting devices, while allowing for a short cutting time. This cut-off time will be defined by the speed of each carcass transport line.

According to a preferred embodiment of the invention, one or more elements of the outer carcass guiding mechanism and one or more elements of the inner carcass guiding mechanism are disposed on both sides of the frame. This allows the cutting means of the carcass to be placed in the empty space between said two parts.

With reference to the inner side articulated support, according to a possible embodiment of the invention it incorporates an extended portion that extends in a first direction, where this extended portion is configured to stabilize the carcass by centering the sternum of the carcass. In this possible embodiment of the invention, the inner roller(s) is(are) connected to a part of the inner roller support opposite to the direction along which the extended portion extends. The extended portion provided on one side of the inner side roller support allows to better stabilize the carcass during the longitudinal cutting process by centering the sternum of the carcass. A slight improvement is achieved in terms of the stabilization of the carcass, although this extended portion can be dispensed with and the cutting accuracy of the cutting tool would also be acceptable. Preferably, the inner side support comprises, in a part opposite to where the extended portion is, corresponding fixing points spaced apart from each other for the fixing of respective rollers, where each roller is fixed to the inner side articulated support by a different fixing point.

With reference to the cutting means of the carcass into two halves and the actuating means for the cutting means, according to a possible embodiment of the invention the cutting means are disposed on the front of the frame, while the actuating means are disposed on the rear of the frame. Preferably, the cutting means of the carcass in two halves can be embodied in a motorized saw disk and the actuating means comprise a motor for rotating the saw disk at a certain rotation speed. "Motorized saw blade" means a blade having a saw on its circumferential edge and which is rotated by rotating means. However, cutting means other than a saw blade may also be employed without altering the essential nature of the present invention. Preferably, the actuating means for the cutting means further comprise a coupling and a transmission (by chain, belt, cardan, pinions or gears) for transmitting the movement and the force from the motor to the cutting disk.

With reference to the rollers, they are preferably arranged by pairs of two wheels of equal dimensions and configuration, which are disposed facing each other, and where each wheel (referred to as the left wheel and the right wheel) is rotatable, independently of the other, when making contact with the surface of the carcass.

According to a possible embodiment of the invention, four inner-side rollers are provided, arranged in pairs, where two inner-side rollers are disposed at the same height and the other two inner-side rollers are disposed at another different height in the inner-side support fixed at their centers by respective fixing points. These joints allow the free rotation of the rollers.

Also according to a possible embodiment of the invention, four outer side rollers are provided arranged in pairs, where each pair of rollers is disposed at the same height and where one pair of rollers (referred to as the upper rollers) is disposed at a point near the free end of the upper tilting arm and the other pair of rollers (referred to as the lower rollers) is disposed at a point near the free end of the lower tilting arm. The two pairs of upper rollers (upper pair and lower pair) may be of different size and configuration from each other, whereas the rollers of the same pair are preferably identical in shape and geometry. For example, the upper roller pair has a more round profile, while the lower roller pair has a more tapered profile. This tapered shape advantageously allows the pair of rollers to be better fastened to the neck part of the carcass.

With regard to the outer follower mechanism of the carcass, preferably, the common articulation axis of the two independent tilting outer side arms is disposed at a point of the frame, where for example said point of the frame is disposed at a lower part of the frame and the upper and lower tilting arms are disposed at the articulation axis, so that one outer side arm rotates on the inside and the other on the outside.

Preferably, the tilting arm has two parts spaced a certain distance apart, so that there is a gap between which the motorized saw disc can pass. Also preferably, the tilting arm has a length greater than the diameter of the disc of the motorized saw, so that when it is positioned in a downward tilted position (which is when the cutting process is initiated at the top of the carcass) the inner side support remains in a lower position than the motorized saw.

With reference to the first, second, third and fourth actuating means, preferably each is a cylinder, which can be pneumatic or electric.

According to a preferred embodiment of the invention, the cutting tool of the present invention comprises a fixing flange to be fixed to the free end of a robot arm, for example by screws and threads. Preferably, said fixing flange is disposed inclined with respect to the longitudinal axis of the cutting tool. This inclination allows the cutting tool to adopt the different spatial positions of the cutting saw and of the follower mechanisms of the inner and outer side.

Preferably, the cutting tool of the present invention incorporates a laser, an optical system, or an artificial vision system configured to provide, before the cutting process is carried out, specific measurements or coordinates of the anatomy of each carcass. In addition, it also incorporates a processor which is connected to the artificial vision system and also to the actuating means of the cutting tool. Based on said measurements or coordinates of the carcass to be cut received from the artificial vision system, the processor (which houses predetermined data) instructs the different means of actuation of the cutting tool and also of the robot to position itself and adjust its different movements and forces to carry out the cutting process of that particular carcass. By way of example, said artificial vision device includes at least one camera for capturing images of the meat product and a computer program that analyses said images by combining them with the cutting requirements to determine different points $(x_i, y_i, z_i)$ and different forces to be exerted by the different elements of the cutting tool. For example, the spatial coordinates of the entry point $(x_i\ ent, y_i\ ent, z_i\ ent)$ where the cutting element is to be positioned to initiate cutting, as well as the spatial coordinates of the exit point $(x_i\ sal, y_i\ sal, z_i\ sal)$ of the cutting element, are determined.

A possible operation of the cutting tool of the present invention is as follows: when the animal carcass, which is hung by its two legs face down, for example by a hook on each leg or by a chain, is positioned in front of the robot having the cutting tool of the invention, the cutting tool approaches the upper part of the carcass (i.e. the part of the feet) with the tilting arm of the inner follower mechanism of the carcass in an extended position (i.e. an approximately horizontal starting direction) in order to pass over the carcass. Once the carcass passes, said arm is lowered (approximately 60 to 90° with respect to the appreciably horizontal direction), remaining in an approximately vertical position towards below, so that the rollers of the inner follower mechanism are positioned on the inner side of the upper part of the carcass. In this starting position, the rollers of the outer follower mechanism also approach the carcass, being placed above the outer side of the top of the carcass to initiate cutting of the part, so that the distance between the inner rollers and the outer rollers becomes smaller. In this starting position of the cut, at least part of the extended portion of the inner follower mechanism is outside the carcass. Prior to the start of these movements, the motorized saw disc has started to rotate. During the cutting process, the head moves from top to bottom, so that the motorized saw performs the longitudinal cutting and breaks the carcass into two half-carcasses. Throughout the cutting process, at least a part of the extended portion of the inner follower mechanism is always outside the carcass, and the inner rollers and the outer rollers at all times follow the inner and outer side of the carcass respectively.

The second aim of the present invention is to design a robot for the cutting tool described above. According to this second aim, the present invention relates to a robot comprising a support base on which one or more articulated arms are disposed, wherein the robot presents a movement of six degrees of freedom of its free end, characterized in that it comprises at its free end the cutting tool defined above. In this way, the anchoring point of the cutting tool is positioned at a predetermined point $(x_i, y_i, z_i)$, i.e. it can move in a three-dimensional space in any direction and, furthermore, about any axis of rotation $(\alpha_i, \beta_i, \gamma_i)$.

According to a preferred embodiment, the robot has articulated arms, where the cutting tool is mounted at the free end of an upper arm of the robot, and where the robot has servomotors that generate the six degrees of freedom.

BRIEF DESCRIPTION OF THE DRAWINGS

In order to better understand the description made, a set of drawings has been provided which, schematically and solely by way of non-limiting example, represent a practical example of embodiment of this invention.

DESCRIPTION OF A PREFERRED EMBODIMENT

A preferred embodiment of the cutting tool 1 and the robot is described below with reference to FIGS. 1 to 13.

Figure 1:
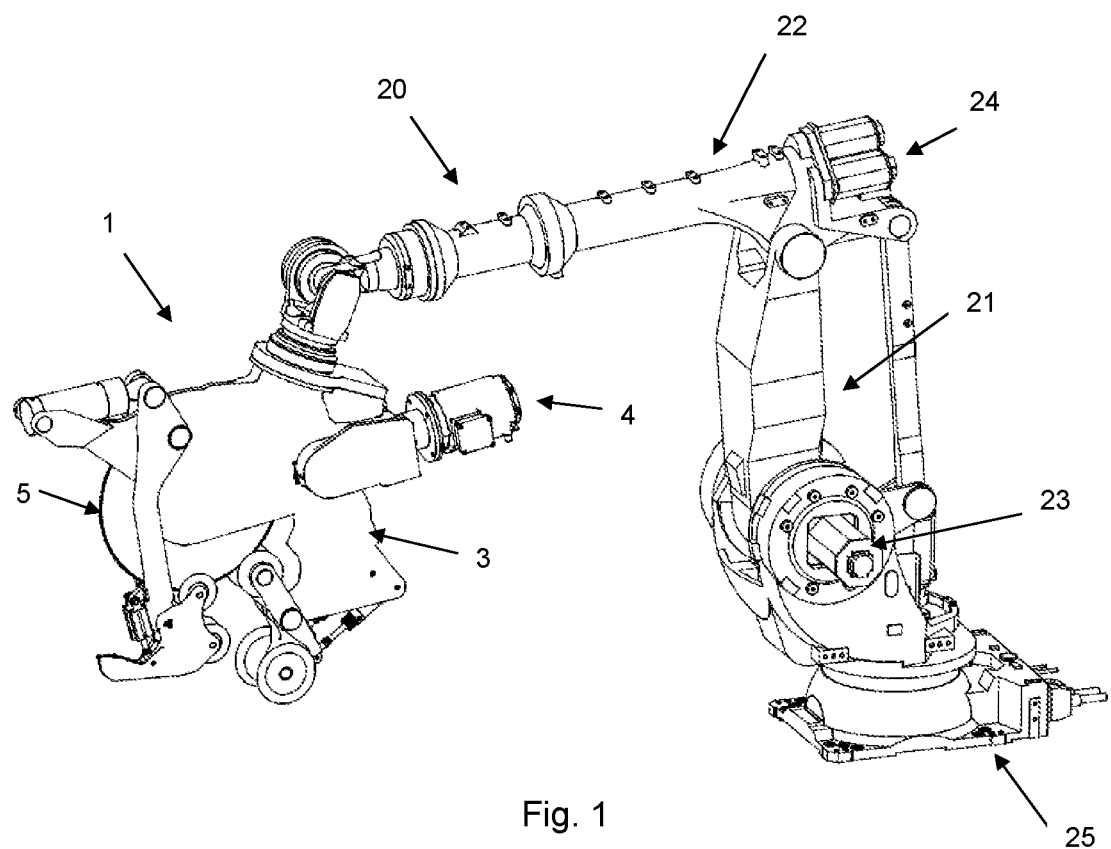
FIG. 1 shows a perspective view of the robot object of the invention where the cutting tool is mounted at its free end, and where the carcass has not been depicted.

FIG. 1 shows a preferred practical embodiment of the robot 20, with the cutting tool 1 disposed at the upper free end of the robot arm. The robot 20 is placed on a bench (not shown in FIG. 1) that allows the robot to settle in a specific fixed position and at a required height according to the specific characteristics of the factory where it is installed. The robot 20 has a flat base 25 and arms 21, 22 articulated by the action of one or more servomotors 23, 24, which allow the cutting tool 1 to be positioned and displaced in the desired spatial positions ($x_i, y_i, z_i, \alpha_i, \beta_i, \gamma_i$). The cutting tool 1 is removably mountable at the free end of the upper robot arm 22 of the robot 20, thus allowing an attachment that is stable and easy to assemble/disassemble. With this advantageous configuration in a robot arm, the cutting tool 1 is able to be positioned, in an automated way, at any point in three-dimensional space.

Figure 2:
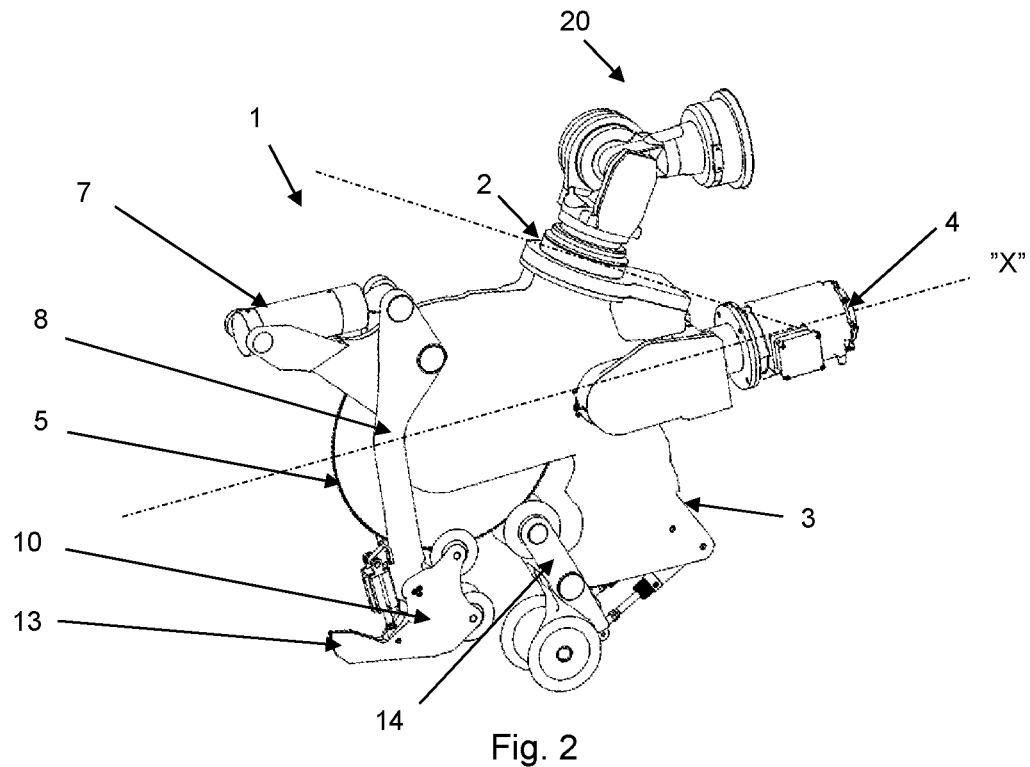
FIG. 2 shows a perspective view of the cutting tool of FIG. 1 and wherein a small part of the robot arm is illustrated.
Figure 3:
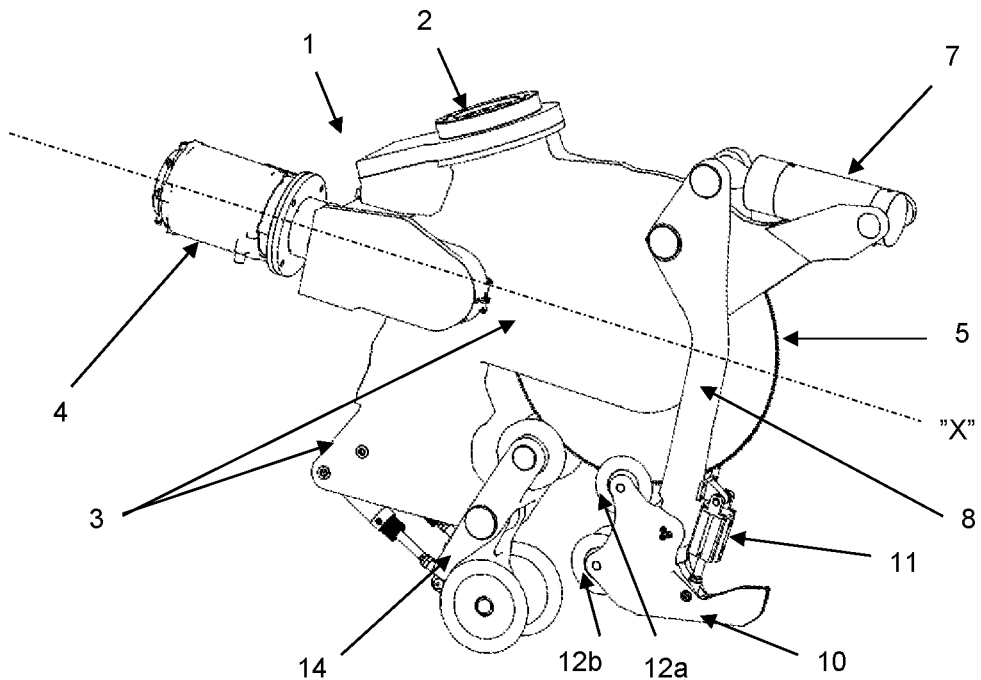
FIG. 3 shows another view in a different perspective of the cutting tool of FIG. 1.

FIGS. 2 and 3 show in detail the cutting tool 1 of FIG. 1 at two different angles. The frame 3 can be seen extending in an upper longitudinal direction and also in a lower vertical direction. Also shown is the motorized saw disk 5 for cutting the carcass 30 in two halves, arranged in a front position of the frame 3, and the motor 4 of rotation of the motorized saw disk 5, arranged in a rear position of the frame 3. Also shown is the fixing flange 2, located at the top of the cutting tool 1, which is inclined (by 30 degrees approximately) with respect to the longitudinal axis "X" of the frame 3 of the cutting tool 1. FIG. 2 also illustrates a part of the robot arm 20 where the fixing flange 2 of the cutting tool 1 is fixed.

FIGS. 2 and 3 also show a possible configuration of the inner follower mechanism of the carcass 30, which is formed by the following elements:

an articulated arm 8, formed by two parts that are disposed on both sides of the frame 3, where both parts are articulated by the same axis of articulation ea1 disposed on the upper part of the frame 3, a first pneumatic cylinder 7 for actuating the articulated arm 8, an inner roller support 10, formed by two wings 10', 10", spaced apart, which are disposed on each side of the frame 3, articulated by an articulation axis ea disposed at the lower end of the two parts of the articulated arm 8, and in this case the inner roller support 10 also incorporates an extended portion 13 extending in the opposite direction to the inner side rollers 12a, 12b, a second pneumatic cylinder 11 for rotation of the inner roller support 10, and four inner side rollers: two upper rollers 12a right, 12a left, and two lower rollers 12b right, 12b left, connected to different heights of the inner side support 10 in an area of the support 10 opposite to where the extended portion 13 extends, and where each pair of left rollers 12a left, 12b left and 12a right, 12b right is fastened to a different wing 10', 10" of the inner side support 10.

Figure 8:
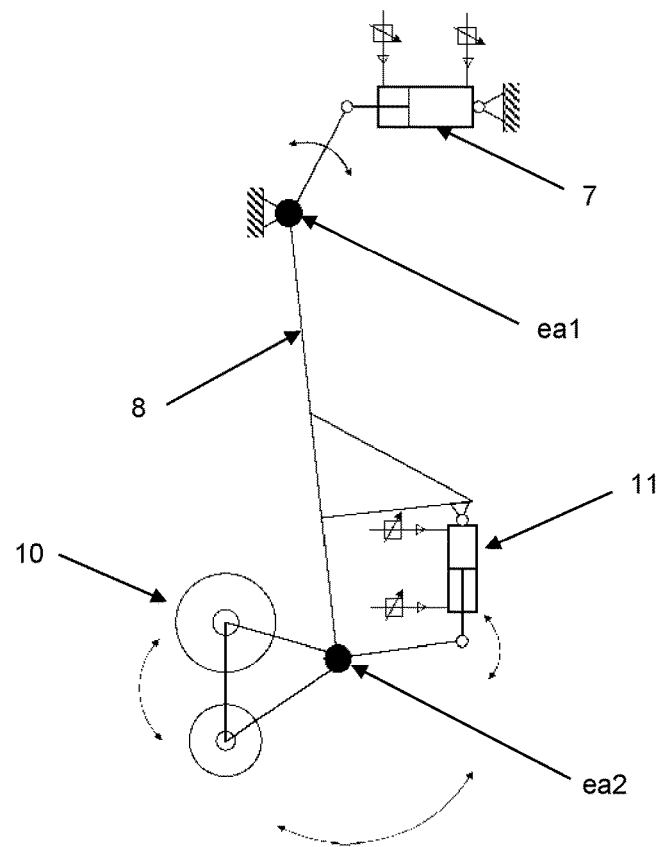
FIG. 8 shows a schematic of the structure and movements of the internal follower mechanism of the carcass.

The movement, in a schematic way, of the inner follower mechanism of the carcass 30 is depicted in FIG. 8, where the first pneumatic cylinder 7 (with its respective flow regulators) that actuates the articulated arm 8, and shows the arm 8 articulated above on an articulation axis ea1 and on whose lower part the support 10 articulated on the lower part of the arm 8 by the articulation axis ea2 is fixed. The second pneumatic cylinder 11 (with respective flow regulators) that actuates the support 10 is disposed in said second axis of articulation ea2. Two of the upper and lower rollers of the support 10 are shown.

Figure 12:
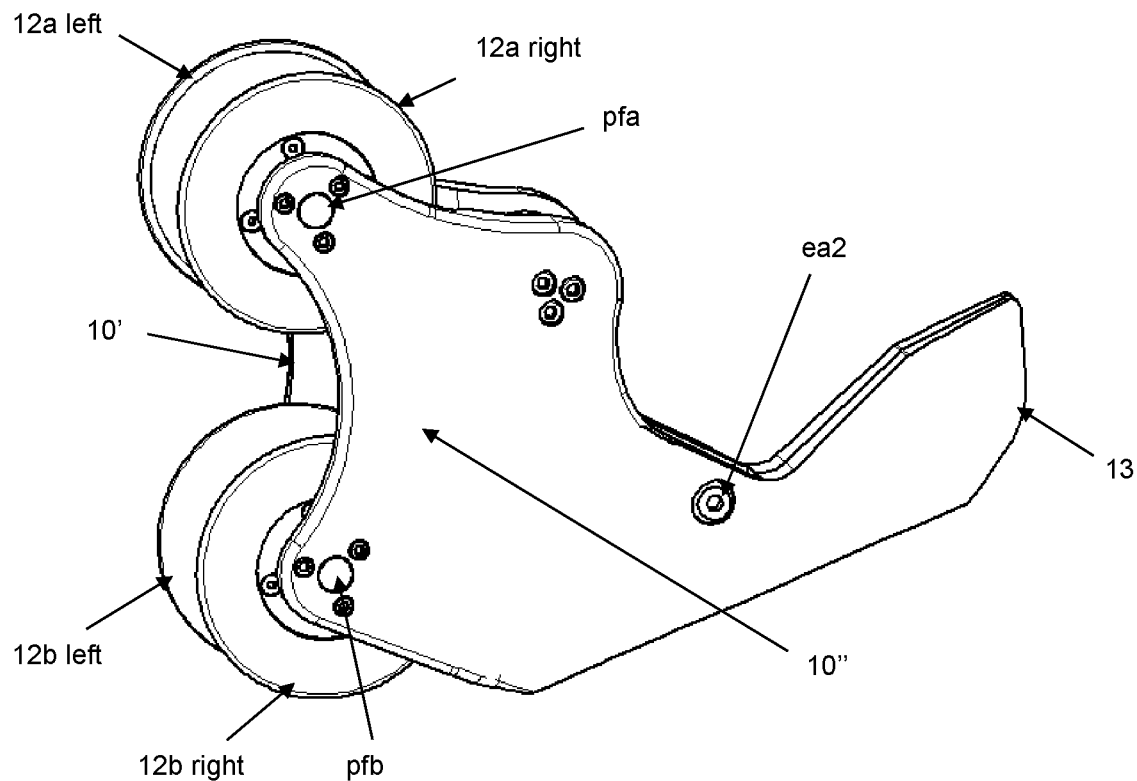
FIG. 12 shows a side elevation view of the inner side follower mechanism of the carcass object of the present invention.
Figure 13:
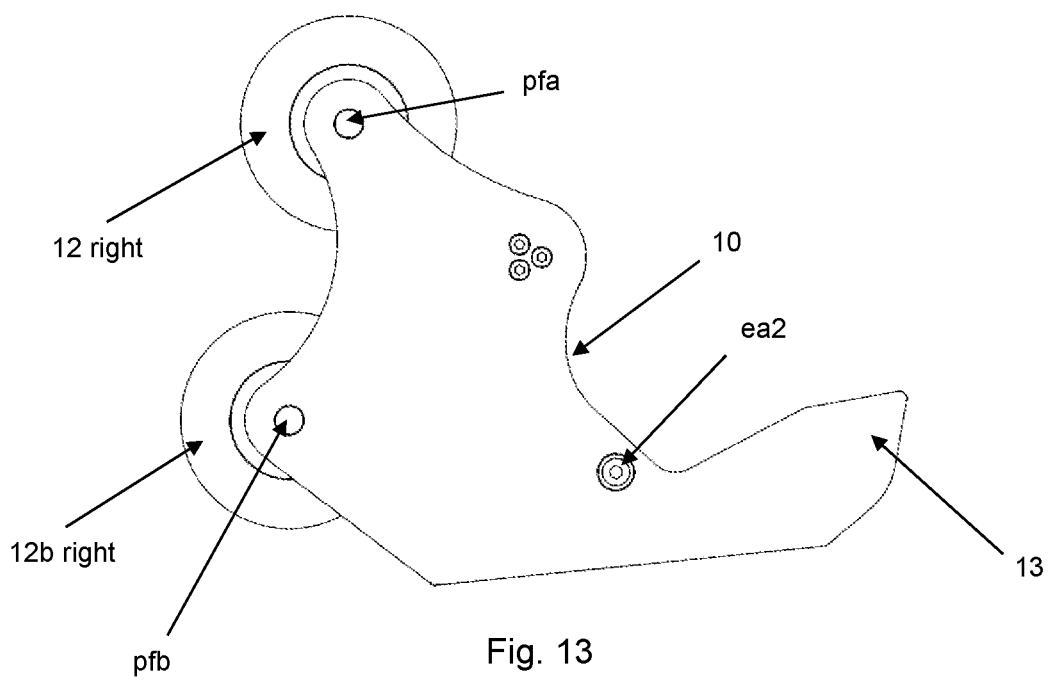
FIG. 13 shows a front elevation view of the inner side follower mechanism of the carcass object of the present invention.

The lower part of the inner follower mechanism of the carcass 30 is shown in detail in FIGS. 12 and 13. FIGS. 12 to 13 show a possible geometry with a possible configuration of the four inner rollers 12a left, 12b left, 12a right, 12b right, without this configuration being limiting. FIG. 12 shows that the extended portion 13 presents a slight upward inclination and ends in the form of a tip. FIG. 13 shows the two wings 10', 10" of the inner roller support 10 and the two double rollers 12a left, 12b left and 12a right, 12b right fixed at four different fixing points on these two wings 10', 10". The four inner rollers 12a left, 12b left, 12a right, 12b right have a taper that decreases in the inward direction. FIG. 13 shows the fixing point pfa to the right upper roller support 12a right and the fixing point pfb to the right lower roller support 12b right, as well as the articulation axis ea2 of the support 10.

Also shown in FIGS. 2 and 3 is the outer follower mechanism of the carcass 30 formed by the following elements:

an upper tilting arm 14 for supporting two upper outer side rollers 16 right, 16 left, wherein the first upper tilting arm 14 tilts with respect to a common articulation axis disposed at a lower point of the frame 3, two upper outer side rollers 16 right, 16 left for the upper guidance of the dorsal part of the carcass 30, wherein the two upper outer side rollers 16 right, 16 left are disposed at respective fixing points at the free end of the upper tilting arm 14, a third pneumatic cylinder 17 for rotation of the upper tilting arm 14, another lower tilting arm 18 for supporting two lower outer side rollers 20 right, 20 left, wherein the lower tilting arm 18 tilts with respect to the same common articulation axis 15 of the frame 3, two lower outer side rollers 20 right, 20 left for the lower guidance of the dorsal part of the carcass, wherein said lower outer side rollers 20 right, 20 left are disposed at respective fixing points at the free end of the lower tilting arm 18, and a fourth pneumatic cylinder 21 for rotation of the lower tilting arm 18.

As can be seen in the embodiment of FIGS. 2 and 3, the first pneumatic cylinder 7 is disposed in an advanced position with respect to the articulated arm 8, which is advantageous for the stability of all the components of the cutting tool 1.

Figure 9:
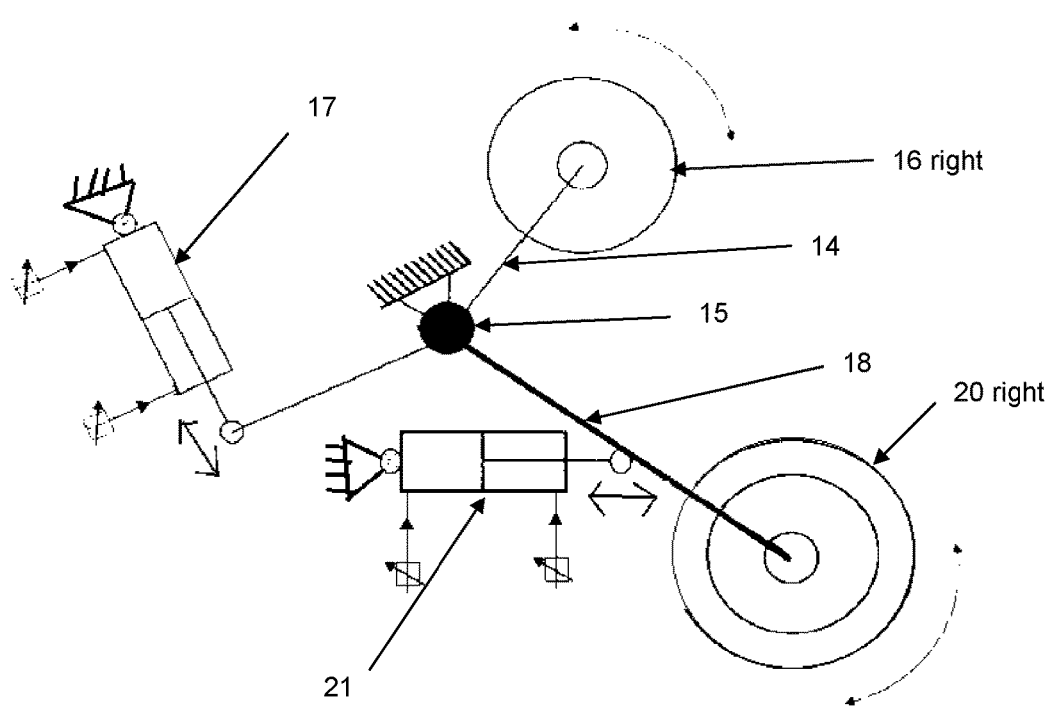
FIG. 9 shows a schematic of the structure and movements of the outer follower mechanism of the carcass.

FIG. 9 shows schematically the movement of the outer follower mechanism of the carcass 30, wherein the third pneumatic cylinder 17 (with its respective flow regulators) that actuates the upper tilting arm joint 14 and the fourth pneumatic cylinder 21 (with its respective flow regulators) that actuates the lower tilting arm joint 18 are seen. FIG. 9 also shows how both tilting arms 14 and 18 tilt with respect to a same axis of articulation 15.

Figure 10:
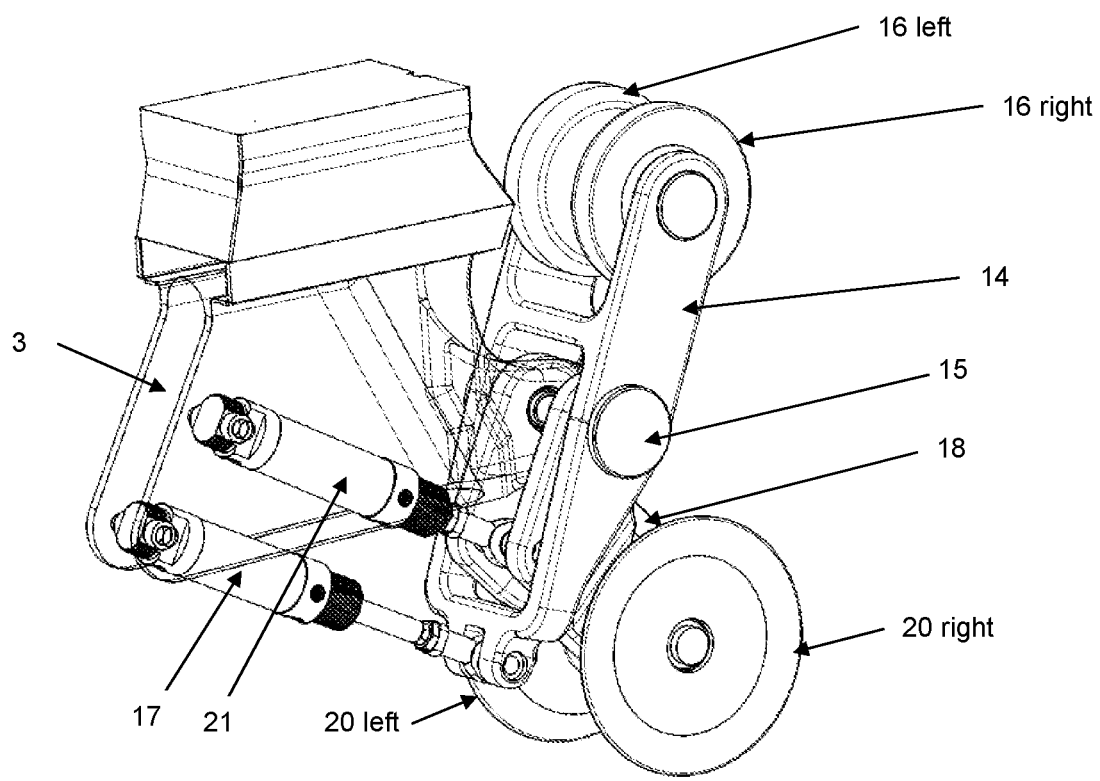
FIG. 10 shows a perspective view of the outer follower mechanism of the carcass object of the present invention in a specific position of the two tilting arms.
Figure 11:
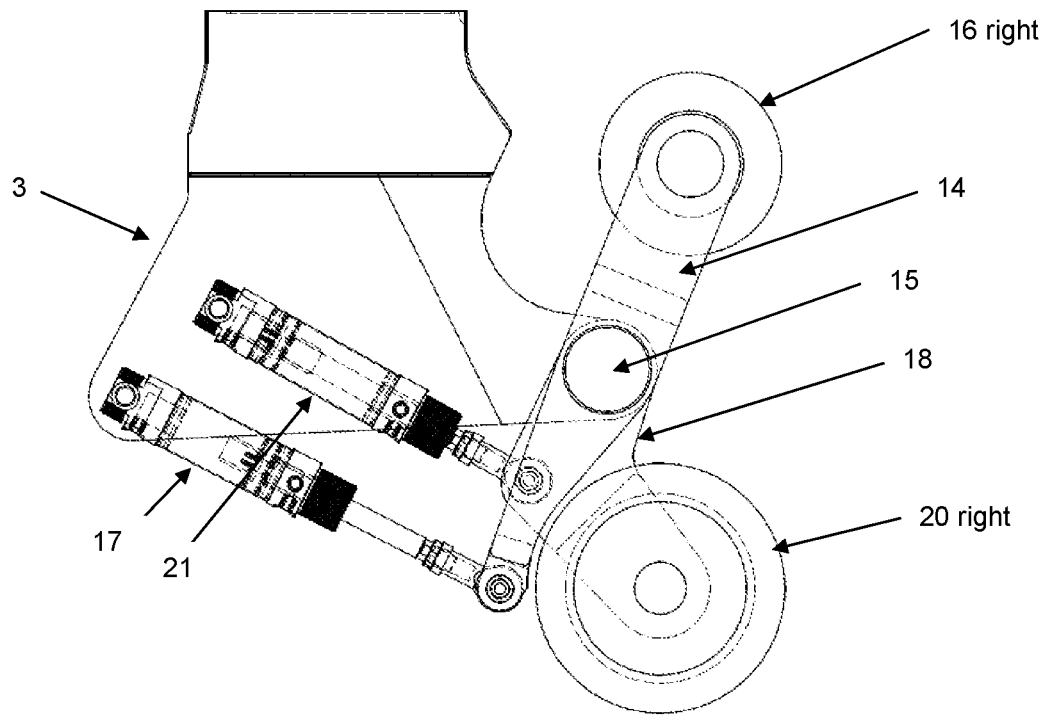
FIG. 11 shows a side elevation view of the outer follower mechanism of the carcass object of the present invention in a specific position of the two tilting arms.

FIGS. 10 and 11 show in detail the outer follower mechanism of the carcass 30, wherein the two tilting arms (upper 14 and lower 18) and the two pneumatic or electric cylinders 17 and 21 and also the common articulation axis 15 are observed. FIG. 10 also shows the geometry of the upper outer side rollers 16 and lower rollers 20. In this possible specific embodiment of the invention, the two lower outer side rollers 20 have a larger diameter compared to the two upper outer side rollers 16 and the separation between the left and right rollers of the lower outer side double roller 20 is greater than the separation between the left and right rollers of the upper outer side double roller 16. The common articulation axis 15 is disposed at one end of each tilting arm 14, 18, where one of the arms 14, 18 rotates on the inside and the other on the outside.

FIGS. 4 to 7 show a possible robot 20 with a preferred embodiment of the cutting tool 1 at different times of the cutting process of a beef carcass 30. In said FIGS. 4 to 7 a part of the bench 19 on which the base 25 of the robot 20 is mounted has been represented.

As long as the cutting process takes place, the carcass 30 remains hanging from its two legs in an upside-down position, and it is the cutting tool 1 and the robot arm that approach said carcass 30 and cut it in half, from top to bottom. Generally, the carcasses 30 to be cut circulate through a carousel (not shown in the figures), where there is a space between each carcass 30.

At a time prior to the start of the cutting process, an artificial vision device and other complementary mechanisms (not shown in the accompanying figures) determine, by means of an analysis prior to the cutting process of the carcass 30, to cut different specific values of the anatomy of the carcass 30 of the meat product to be cut. From these measured values a processor outputs the different parameters relating to the positions and/or the speeds and/or accelerations of the cutting tool 1 and of the robot 20 (that is, of its different joints and of the forces of the different cylinders), both in its initial starting position of the cut and during the cutting process.

Figure 4:
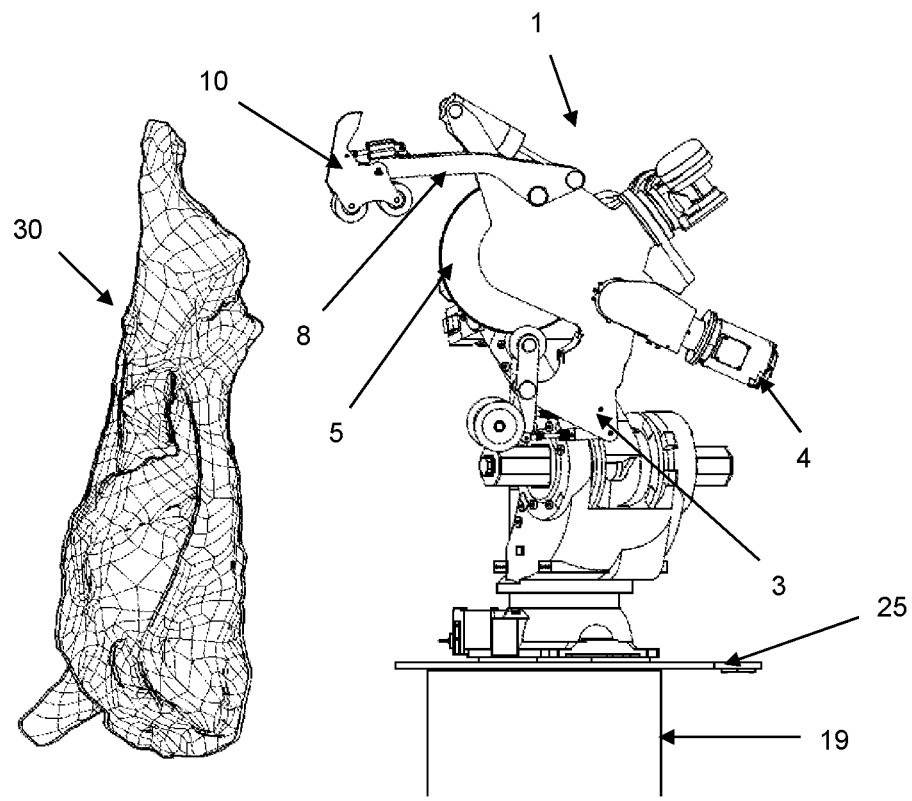
FIGS. 4 to 7 show, respectively, different side elevation views of the robot with the cutting tool of FIGS. 1 to 3 at different times in the process of cutting the carcass.
Figure 5:
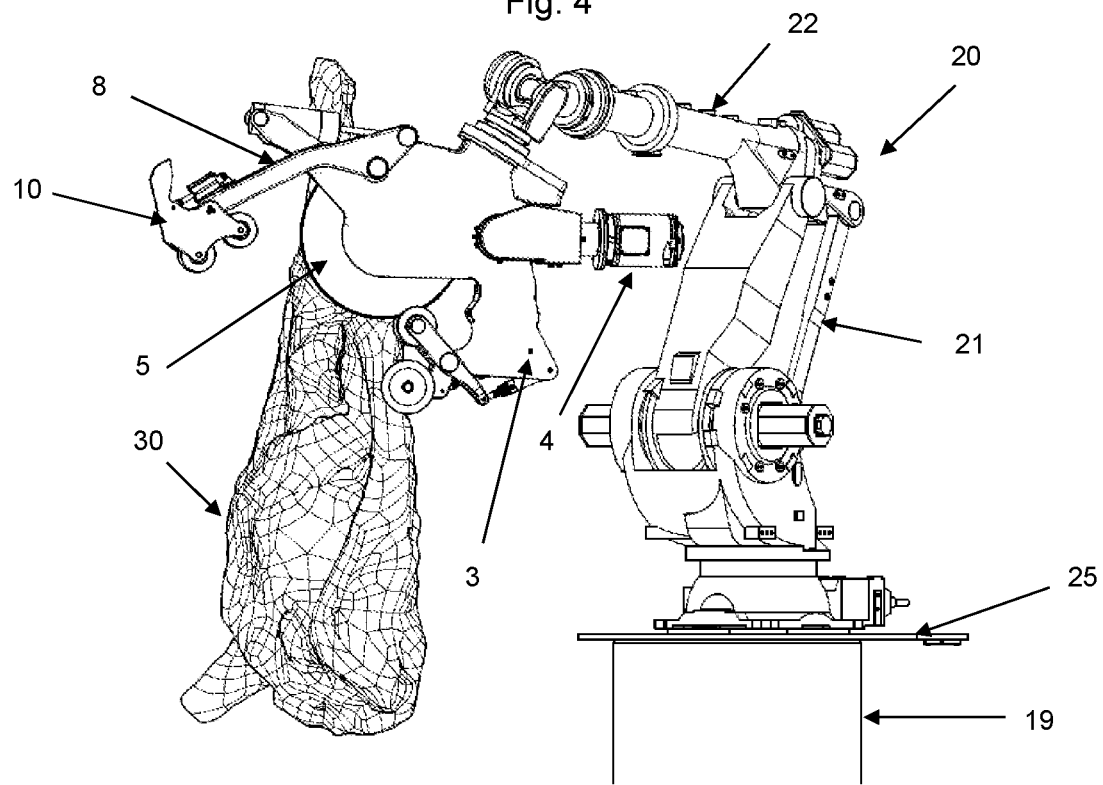
Figure 6:
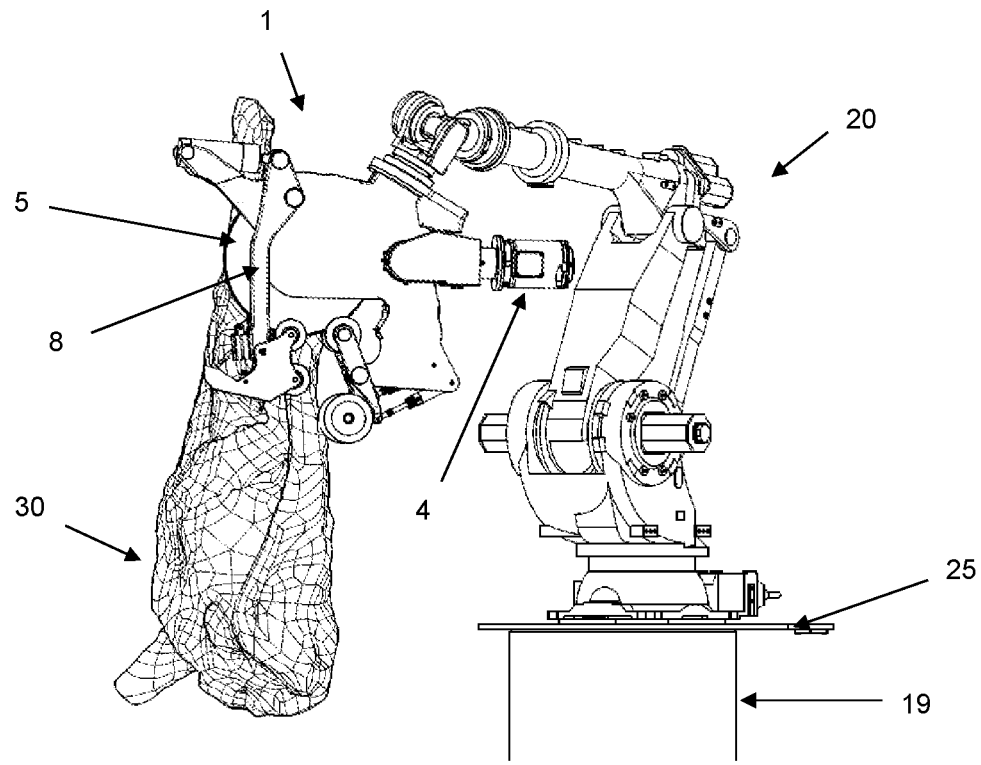
Figure 7:
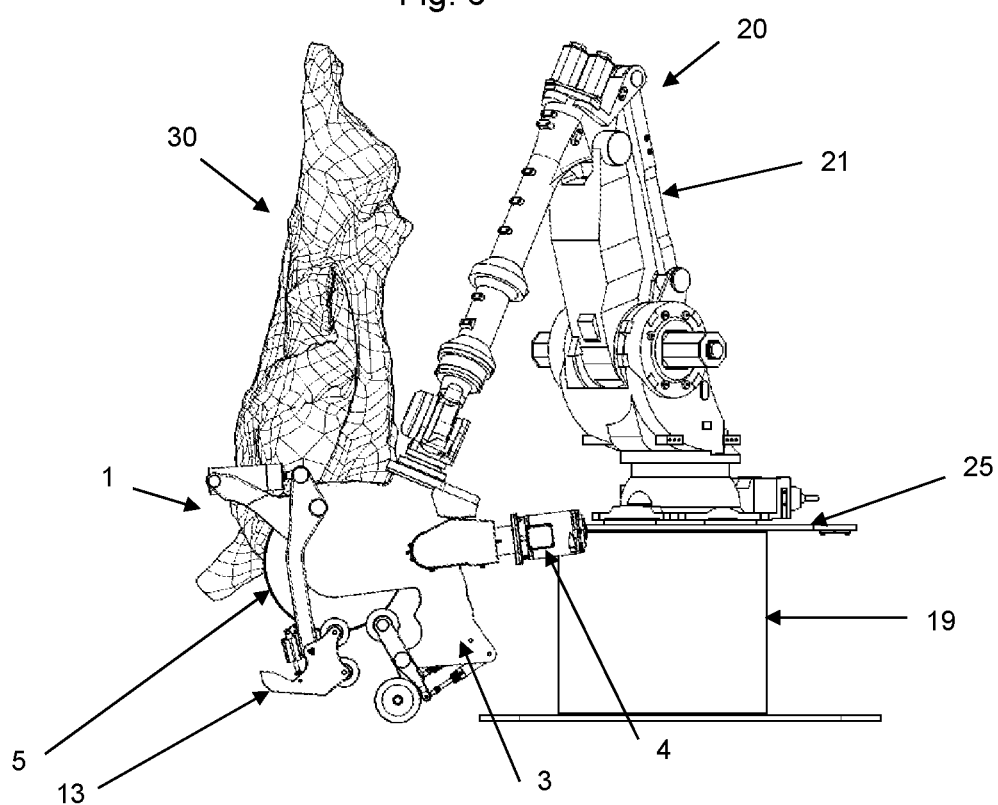

At a first moment of the cutting process, as shown in FIG. 4, the cutting tool 1 approaches the carcass 30. In this first approach position the arm 8 is in a substantially horizontal position so that it can pass to the top of the carcass 30. In a second position, shown in FIG. 5 below, the arm 8 is positioned along the back of the carcass 30 and rotates until it reaches the substantially vertical position (shown in FIG. 6). As shown in FIG. 6, when the cutting by the motorized saw 5 has already started, the arm 8 is held in this substantially vertical position face down during the entire longitudinal cutting of the carcass 30. Finally in FIG. 7, which is a final moment of descent where the entire carcass 30 has already been cut into two half-carcasses (not shown), it is seen how the arm 8 is kept in this same substantially vertical position face down and the rollers of the inner and outer side next to each other. FIGS. 6 and 7 show different positions of the two tilting arms 14, 18 of the outer follower mechanism, since when following the irregular surface of the back of the carcass 30 they gradually adapt to the different curvatures and irregularities of the surface of the animal.

Although reference has been made to a specific embodiment of the invention, it is clear to a person skilled in the art that the cutting tool and robot provided with said cutting tool described above are subject to numerous variations and modifications, and that all the details mentioned may be replaced by others technically equivalent, without departing from the scope of protection defined by the attached claims.

The invention claimed is:

1. A cutting tool for cutting a meat piece carcase into two halves, wherein the carcases are suspended hanging from their legs, wherein the cutting tool is made to be coupled to a robot, and wherein the cutting tool comprises:
    a frame, configured to be connected to a robot arm,
    a cutting unit configured for cutting the carcase in two halves by means of a longitudinal cut,
    an actuating unit configured for actuating the cutting unit, and
    a guiding unit configured for guiding the carcase during a cutting process, comprising:
        an inner follower mechanism of the inner side of the carcase, configured to follow the inner side of the carcase during the cutting process, and
        an outer follower mechanism of the outer side of the carcase, configured to follow the outer side of the carcase during the cutting process,
    wherein the inner follower mechanism of the carcase comprises at least the following elements:
        an arm articulated at its upper end to a point on the frame,
        a first actuating unit configured for actuating the articulated arm,
        an inner side support, which is articulatedly fastened at the lower end of the articulated arm,
        a second actuating unit configured for rotating the inner side support, and
        one or more inner side rollers connected to the inner side support, where the one or more inner side rollers are configured to guide the ventral part of the carcase.

2. The cutting tool according to claim 1, wherein the outer follower mechanism of the carcase comprises at least the following elements:
    an upper tilting arm for supporting one or more upper outer side rollers, where the upper tilting arm tilts with respect to a common articulation axis disposed at a point of the frame,
    one or more upper outer side rollers for upper guidance of the dorsal part of the carcase, wherein one or more upper outer side rollers is/are disposed at the free end of the upper tilting arm,
    a third actuating unit configured for rotating the upper tilting arm,
    a lower tilting arm for supporting one or more lower outer side rollers, wherein the lower tilting arm tilts with respect to the same common articulation axis of the frame,
    one or more lower outer side rollers for lower guidance of the dorsal part of the carcase, wherein one or more lower outer side rollers are disposed at the free end of the lower tilting arm,
    a fourth actuating unit configured for rotating the lower tilting arm.

3. The cutting tool according to claim 1, wherein one or more elements of the outer carcase guiding mechanism and one or more elements of the inner carcase guiding mechanism are disposed on either side of the frame, to allow the cutting unit to pass through.

4. The cutting tool according to claim 1, wherein the inner side support comprises an extended portion extending in a direction opposite to where the one or more inner side rollers are disposed.

5. The cutting tool according to claim 1, wherein the cutting unit is disposed on the front of the frame and the actuating configured for actuating the cutting unit is disposed on the rear of the frame.

6. The cutting tool according to claim 1, wherein the cutting unit comprises a motorized saw disc.

7. The cutting tool according to claim 6, wherein the actuating unit comprises a motor for rotating the saw disc, a coupling and a transmission for transmitting movement and force from the motor to the motorized saw disc.

8. The cutting tool according to claim 2, wherein the articulation axis common to the upper and lower tilting arms is disposed in a lower part of the frame and the upper and lower tilting arms are disposed in the articulation axis, so that one arm rotates on the inside and the other on the outside.

9. The cutting tool according to claim 1, wherein the articulated arm has two parts spaced apart from each other by a certain distance through which the cutting unit pass.

10. The cutting tool according to claim 1, wherein four inner-side rollers are provided, arranged in pairs, wherein two inner-side rollers are disposed at the same height and the other two inner-side rollers are disposed at a different height on the inner-side support by respective fixing points.

11. The cutting tool according to claim 2, wherein four outer-side rollers, arranged in pairs, are provided, wherein each pair of rollers is disposed at the same height, and wherein the pair of upper rollers is disposed at a point near the free end of the upper tilting arm and the pair of lower rollers is disposed at a point near the free end of the lower tilting arm.

12. The cutting tool according to claim 1, wherein it further includes a laser or optical artificial vision system, configured to provide, before the cutting process is carried out, specific measurements or coordinates of the anatomy of each carcase, to position and adjust the movements and force of the different parts of the cutting tool.

13. The cutting tool according to claim 1, further comprising at the top of the cutting tool a fixing flange for fixing the cutting tool to a free end of a robot arm, and wherein the fixing flange is disposed inclined with respect to the longitudinal axis of the frame of the cutting tool.

14. A robot, comprising a support base on which one or more articulated arms are disposed, wherein the robot comprises, mounted at a free end of an articulated arm, a cutting tool comprising:
 a frame connected to one of said articulated arms,
 a cutting unit configured for cutting the carcase in two halves by means of a longitudinal cut,
 an actuating unit configured for actuating the cutting unit, and
 a guiding unit configured for guiding the carcase during a cutting process, comprising:
  an inner follower mechanism of the inner side of the carcase, configured to follow the inner side of the carcase during the cutting process, and
  an outer follower mechanism of the outer side of the carcase, configured to follow the outer side of the carcase during the cutting process,
 wherein the articulated arm presents a spatial movement of its free end with six degrees of freedom, and
 wherein the inner follower mechanism of the carcase comprises at least the following elements:
  an arm articulated at its upper end to a point on the frame,
  a first actuating unit configured for actuating the articulated arm,
  an inner side support, which is articulatedly fastened at the lower end of the articulated arm,
  a second actuating unit configured for rotating the inner side support, and
  one or more inner side rollers connected to the inner side support, where the one or more inner side rollers are configured to guide the ventral part of the carcase.

15. A cutting tool for cutting a meat piece carcase into two halves, wherein the carcases are suspended hanging from their legs, wherein the cutting tool is made to be coupled to a robot, and wherein the cutting tool comprises:
 a frame, configured to be connected to a robot arm,
 a cutting unit configured for cutting the carcase in two halves by means of a longitudinal cut,
 an actuating unit configured for actuating the cutting unit, and
 a guiding unit configured for guiding the carcase during a cutting process, comprising:
  an inner follower mechanism of the inner side of the carcase, configured to follow the inner side of the carcase during the cutting process, and
  an outer follower mechanism of the outer side of the carcase, configured to follow the outer side of the carcase during the cutting process,
 wherein the outer follower mechanism of the carcase comprises at least the following elements:
  an upper tilting arm for supporting one or more upper outer side rollers, where the upper tilting arm tilts with respect to a common articulation axis disposed at a point of the frame,
  one or more upper outer side rollers for upper guidance of the dorsal part of the carcase, wherein one or more upper outer side rollers is/are disposed at the free end of the upper tilting arm,
  a third actuating unit configured for rotating the upper tilting arm,
  a lower tilting arm for supporting one or more lower outer side rollers, wherein the lower tilting arm tilts with respect to the same common articulation axis of the frame,
  one or more lower outer side rollers for lower guidance of the dorsal part of the carcase, wherein one or more lower outer side rollers are disposed at the free end of the lower tilting arm,
  a fourth actuating unit configured for rotating the lower tilting arm.

* * * * *